United States Patent Office 3,118,950
Patented Jan. 21, 1964

3,118,950
PROCESS FOR THE PRODUCTION OF
ALKYLATED BORANES
Malcolm George Hugh Wallbridge, Edmonton, Alberta, Canada, and Leonard Haynes Long, Exeter, Devonshire, England, assignors to National Research Development Corporation, London, England, a British corporation
No Drawing. Filed Feb. 2, 1959, Ser. No. 790,400
Claims priority, application Great Britain Feb. 13, 1958
8 Claims. (Cl. 260—606.5)

The present invention relates to the production of alkylated boranoes by a novel process.

According to the invention we provide a process for the production of alkylated boranes having the formula $$B_2H_{(6-n)}(Alk)_n$$

wherein $n=1, 2, 3$ or $4$, by reacting at a suitable temperature within the range 0–200° C. and a suitable pressure within the range 1–250 atmospheres or higher a hydride containing chemically combined metal, for example $LiAlH_4$, $NaBH_4$ or $LiBH_4$, with (a) a boron trialkyl $B(Alk)_3$ and a hydrogen halide or (b) a bono trialkyl $B(Alk)_3$ and a boron halide $BX_3$ or (c) an alkyl boron halide having the formula $(Alk)_mBX_{(3-m)}$, wherein $m=1$ or $2$.

A feature of the invention consists in catalyzing the above reaction, so as to obtain a substantial increase in yield of the alkylated boranes, by adding to the reaction mixture a catalyst which is not reduced by the reactant hydride. Suitable catalysts which may be used are, for example, the aluminium halides such as the bromide, iodide or especially the chloride. The use of aluminium trichloride has been found to result in an increase in yield of the alkylated borane of about two-fold, the yield apparently approaching a quantitative value.

For the process of this invention, whether catalyzed or not, temperatures of the order 60–180° C., and when, the alkyl groups are methyl or ethyl, pressures of the order 40–200 atmospheres, are especially useful. For alkyl groups such as propyl or butyl, atmospheric pressure is preferred. The halogen X may advantageously be chlorine. Alkyl groups such as methyl, ethyl, propyl and butyl are preferred.

This invention without limiting it will now be exemplified below:

Example I

The alkylated boranes were prepared from $NaBH_4$ and $B(CH_3)_3$ and $HCl$.

27.2 g. of $B(CH_3)_3$ and 17.8 g. of $HCl$ were heated with 22.1 g. of $NaBH_4$ in a half-litre stainless steel autoclave at 175° C. for 4 hours at an observed pressure of about 55 atmospheres. After cooling, the gases evolved were released slowly through a trap cooled to −140° C. and all the volatile constituents subsequently distilled off from the autoclave into the trap under reduced pressure. The trap contained 8 g. of tetramethyldiborane $$(B_2H_2(CH_3)_4)$$

together with some dimethyl boron chloride $((CH_3)_2BCl)$ and smaller amounts of trimethyl diborane $(B_2H_3(CH_3)_3)$, dimethyl diborane $(B_2H_4(CH_3)_2)$ and unreacted boron trimethyl $(B(CH_3)_3)$. The volatile gaseous constituents which did not condense at −140° C. were methane (60% by volume) and some hydrogen. The solid constituents remaining in the autoclave at the end of the reaction consisted mainly of NaCl and unreacted $NaBH_4$ (recoverable).

The physical properties observed for $B_2H_2(CH_3)_4$ were M.P. −71° C., vapour pressure 49 mm./Hg at 0° C., vapour density 41.4.

The reaction may be expressed by one or more equations of the following type:

$$3B(CH_3)_3 + HCl + NaBH_4 \rightarrow NaCl + 2B_2H_2(CH_3)_4 + CH_4$$
$$B(CH_3)_3 + HCl + NaBH_4 \rightarrow NaCl + B_2H_4(CH_3)_2 + CH_4$$

Example II

The alkylated boranes were prepared from $LiAlH_4$ and $(nC_3H_7)_2BCl$.

Di-n-propyl boron monochloride $(nC_3H_7)_2BCl$ was prepared in a preliminary stage by passing under atmospheric pressure a stream of hydrogen chloride gas or boron trichloride gas into liquid boron tri-n-propyl $(B(nC_3H_7)_3)$ at the boiling point of the latter i.e. 156° C. and continuously removing the product at a still-head as the product was being formed.

30.6 g. of $(nC_3H_7)_2BCl$ prepared above were introduced into a flask under one atmosphere of nitrogen while 3.92 g. of $LiAlH_4$ suspended in 40 ml. of diethyl ether were slowly added thereto at a temperature of 0° C. (external cooling with ice). After the vigorous reaction had subsided, the mixture was refluxed for 1 hour, air being excluded. The pressure was subsequently reduced to 80 mm. Hg and the volatile products evolved were distilled off through a fractionating column. After the removal of the ether and a little $B(nC_3H_7)_3$ arising from disproportionation, a fraction boiling at 95–108° C. at 80 mm. Hg and weighing 9 g. was separated off, the fraction separated off (being free from chlorine) consisting mainly of tetra-n-propyldiborane $(B_2H_2(nC_3H_7)_4)$ together with a little tri-n-propyldiborane $(B_2H_3(nC_3H_7)_3)$.

The physical properties observed for $B_2H_2(nC_3H_7)_4$ were B.P. 76° C. at 21 mm. Hg pressure, vapour density (Dumas' method) 102.2. However, $B_2H_2(nC_3H_7)_4$ disproportionates progressively at its B.P. in accordance with the equation $$3B_2H_2(nC_3H_7)_4 \rightleftharpoons 2B_2H_3(nC_3H_7)_3 + 2B(nC_3H_7)_3$$

so that it is very difficult to obtain it pure, especially as it is not sufficiently volatile to handle in vacuum apparatus. The vapour density by Dumas' method is 4–5% high, but as this method is only approximate and usually gives values about 10% high with completely stable compounds, the result is compatible with an actual value slightly below the theoretical value of 97.8 corresponding to a few percent disproportionation.

The reaction may be expressed by the equation:

$$4B(nC_3H_7)_2Cl + LiAlH_4 \rightarrow 2B_2H_2(nC_3H_7)_4 + LiCl + AlCl_3$$

Example III

The alkylated boranes were prepared from $NaBH_4$ and $B(CH_3)_3$ and $HCl$ in the presence of aluminium trichloride.

33.3 g. of $B(CH_3)_3$ and 21.8 g. of $HCl$ gas were heated with 22.6 g. of $NaBH_4$ and 6.6 g. aluminium trichloride in a half-litre stainless steel autoclave at 150° C. for 3 hours at an observed pressure of 85 atmospheres. (During the period of heating it was noted that an exothermic reaction commenced at about 90° C.)

After cooling, the gases evolved were released slowly through a trap cooled to −140° C. and all the volatile constituents subsequently distilled off from the autoclave under reduced pressure.

On vacuum fractionation, the products contained in the trap were found to consist of 15.6 g. of $B_2H_2(CH_3)_4$ together with 4.8 g. of $B_2H_3(CH_3)_3$, 5.1 g. of $B_2H_4(CH_3)_2$ and 0.5 g. of $B_2H_5(CH_3)$. The only other products present in isolatable amounts were found to be $CH_4$ (4.93 g.), and $H_2$ and $B(CH_3)_2Cl$. Traces of $B_2H_6$ and unreacted $HCl$ were observed, but no unreacted $B(CH_3)_3$ was found.

40.2 g. of solid was recovered from the autoclave and found to consist mainly of NaCl, aluminium trichloride and unreacted $NaBH_4$.

From the above experiment it can be clearly demonstrated that very much better yields are obtained when aluminium trichloride is present. The total amount of boron found in the methylated diboranes produced is 120.4% of that originally present as $B(CH_3)_3$, proving that boron from $NaBH_4$ enters into the gaseous phase. Assuming that the following chemical equations are applicable for the process:

$3B(CH_3)_3 + NaBH_4 + HCl \rightarrow 2B_2H_3(CH_3)_4 + NaCl + CH_4$
$5B(CH_3)_3 + 3NaBH_4 + 3HCl \rightarrow$
$\qquad 4B_2H_3(CH_3)_3 + 3NaCl + 3CH_4$
$B(CH_3)_3 + NaBH_4 + HCl \rightarrow B_2H_4(CH_3)_2 + NaCl + CH_4$
$3B(CH_3)_3 + 5NaBH_4 + 5HCl \rightarrow$
$\qquad 4B_2H_5(CH_3) + 5NaCl + 5CH_4$ the combined yield of methylated diboranes (based on $B(CH_3)_3$) is 78.2% without correcting for mechanical losses, the true yield probably being about 90%. The amount of $CH_4$ to be expected according to the above equations agrees with that observed almost exactly (within less than 2%).

*Example IV*

The alkylated boranes were prepared from $NaBH_4$ and $B(CH_3)_3$ and $BCl_3$ in the presence of aluminium chloride.

31.6 g. of $B(CH_3)_3$ and 33.2 g. of $BCl_3$ were heated with 32.1 g. of $NaBH_4$ and 9.5 g. of aluminium trichloride in a half-litre stainless steel autoclave at 155° C. for 6 hours and at an observed pressure rising to 87 atmospheres.

After cooling, the gases were released slowly through a trap as before and the volatile products distilled off from the autoclave under reduced pressure.

On vacuum fractionation, the volatile products were found to consist of 1.0 g. of $B_2H_2(CH_3)_4$, 2.4 g. of $B_2H_3(CH_3)_3$, 4.2 g. of $B_2H_4(CH_3)_2$ and 0.3 g. of $B_2H_5CH_3$, together with $CH_4$, $H_2$ and the considerable quantities of $B(CH_3)_2Cl$ and $BCH_3Cl_2$. Small quantities of HCl and $B_2H_6$ were observed, but no unreated $B(CH_3)_3$.

66.0 g. of solid was recovered from the autoclave and found to consist of NaCl, aluminium trichloride, unreacted $NaBH_4$ and unidentified solid compounds of boron. Although in this case the precise course of the reaction is not fully established, it can be readily calculated that the total amount of boron in the methylated diboranes accounts for 45.6% of the boron originally present as $B(CH_3)_3$. The yield is thus lower than when HCl is employed in the place of $BCl_3$.

*Example V*

The alkylated boranes were prepared from $LiBH_4$ and $B(CH_3)_3$ and HCl in the presence of aluminium chloride.

31.9 g. of $B(CH_3)_3$ and 20.9 g. of HCl gas were placed with 15.3 g. of $LiBH_4$ and 12.2 g. of aluminium chloride in a half-litre stainless steel autoclave. The reaction commenced at room temperature and was accompanied by a moderately rapid rise in the pressure. After the pressure had become steady, the reaction was completed by heating to 140° C. for 2 hours at an observed pressure of 75 atmospheres.

After cooling, the volatile products were removed from the autoclave as before. On vacuum fractionation they were found to consist of 11.7 g. of $B_2H_2(CH_3)_4$, 6.0 g. of $B_2H_3(CH_3)_3$, 16.9 g. of $B_2H_4(CH_3)_2$ and 2.3 g. of $B_2H_5CH_3$, together with 1.88 g. of $H_2$ as the only other substance present in quantity. No $CH_4$, unreacted $B(CH_3)_3$ or HCl were detected, and not more than traces of $B_2H_6$ and $B(CH_3)_2Cl$ were present.

34.0 g. of solid were recovered from the autoclave and found to consist mainly of LiCl and aluminium trichloride together with a little unreacted $LiBH_4$.

Since the methylated diboranes produced collectively contain more than twice the amount originally present in the $B(CH_3)_3$, part of their boron comes from the $LiBH_4$. Assuming that the following equations are applicable for the process:

$4B(CH_3)_3 + 2LiBH_4 + 2HCl \rightarrow 3B_2H_2(CH_3)_4 + 2LiCl + 2H_2$
$B(CH_3)_3 + LiBH_4 + HCl \rightarrow B_2H_3(CH_3)_3 + LiCl + H_2$
$2B(CH_3)_3 + 4LiBH_4 + 4HCl \rightarrow 3B_2H_4(CH_3)_2 + 4LiCl + 4H_2$
$B(CH_3)_3 + 5LiBH_4 + 5HCl \rightarrow 3B_2H_5CH_3 + 5LiCl + 5H_2$ the combined yield of methylated diboranes (based on $B(CH_3)_3$) is 86.4% without correcting for mechanical losses. $H_2$ is however also formed by an additional process, since the amount observed exceeded theory by 39%.

The substitution of $LiBH_4$ for $NaBH_4$ therefore results in a yield which is at least as good and causes the reaction to proceed at a lower temperature. It moreover changes the general course of the reaction, in that no methane is formed, its place being taken by hydrogen.

*Example VI*

The alkylated boranes are prepared from $LiBH_4$ and $B(CH_3)_3$ and $BCl_3$.

0.3 mole of $BCl_3$ and 0.6 mole of $B(CH_3)_3$ are heated with 1.0 mole of $LiBH_4$ (i.e. slight excess) in a half-litre stainless steel autoclave. The reaction, which commences slowly at room temperature, proceeds smoothly at 100° C. and is accompanied by a rise in pressure. After 1 hour at 100° C., the reaction is completed by raising the temperature to 140° C. for a few minutes. After cooling, the products are removed from the autoclave as before.

The methylated diboranes are produced in almost quantitative yield according to equation such as $2B(CH_3)_3 + 3LiBH_4 + BCl_3 \rightarrow 3LiCl + 3B_2H_4(CH_3)_2$ No methane is formed, and only a relatively small amount of hydrogen. No other volatile products such as $B(CH_3)_2Cl$ or $BCH_3Cl_2$ are present at the end of the reaction. With $BCl_3$ therefore, the use of $LiBH_4$ is to be preferred above that of $NaBH_4$.

We have observed that at moderaly high temperatures (e.g. 100–180° C.), apart from volatile gases such as methane and hydrogen, the principal volatile products are one or more alkyl-substituted diboranes. The method employed in Example V was noted to be particularly favourable, closely followed by the methods described in Examples III and VI. High ratios $B(Alk)_3/HX$ or $B(Alk)_3/BX_3$ favour the formation of the tetra-alkylated diborane ($n=4$), while progressively lower ratios increasingly favour the formation of less completely alkylated diboranes ($n=3$, 2 or 1 successively). At higher temperatures (i.e. at about 200° C. and above) mixtures of alkyl-substituted derivatives of more complex boranes may be produced from the cracking of the alkylated diboranes and condense as solids or liquids on the interior walls of the reaction chamber.

The alkylated boranes produced by the process of the invention may be used for example as propellants, high energy fuels and intermediates.

We claim:
1. A process for the production of alkylated boranes having the formula $B_2H_{(6-n)}(Alk)_n$, wherein $n=1$ to 4 inclusive, by reacting at a suitable temperature within the range 0–200° C. and a suitable pressure of at least 1 atmosphere a hydride selected from the group consisting of lithium aluminum hydride, sodium boron hydride and lithium boron hydride with a reactive composition selected from the group consisting of

(a) a boron trialkyl $B(Alk)_3$ and a hydrogen halide,
(b) a boron trialkyl $B(Alk)_3$ and a boron halide $BX_3$ and
(c) an alkyl boron halide having the formula $(Alk)_mBX_{(3-m)}$ wherein $m=1-2$.

2. A process according to claim 1 in which temperatures of the order of 60–180° C. are used.

3. A process according to claim 1 in which the alkyl groups of the alkylated boranes are $C_nH_{2n+1}$ wherein $n$ is 1–2 and the pressures used are of the order 40–200 atmospheres.

4. A process according to claim 1 in which the alkyl groups of the alkylated boranes are $C_nH_{2n+1}$ wherein $n$ is 3–4 and the pressures used are of the order of atmospheric pressure.

5. A process according to claim 1 in which there is present in the reaction mixture an anhydrous halide which is not reduced by the reactant hydride.

6. A process according to claim 5 in which the catalyst used is an aluminium halide.

7. A process according to claim 6 in which the catalyst used is aluminium chloride.

8. A process for the production of alkylated boranes having the formula $B_2H_{(6-n)}R_n$, wherein $n$ is an integer from 1 to 4 and R is an alkyl radical which comprises reacting a compound selected from the group consisting of sodium borohydride and lithium borohydride with a trialkylborane and a boron trihalide.

References Cited in the file of this patent

UNITED STATES PATENTS 2,855,440     Walters et al. _____ Oct. 7, 1958

OTHER REFERENCES

Schlesinger et al.: Chem. Reviews, volume 31, pages 13–14 (1942).